(12) United States Patent
No et al.

(10) Patent No.: US 12,316,750 B2
(45) Date of Patent: May 27, 2025

(54) KEY MANAGEMENT SYSTEM FOR HOMOMORPHIC ENCRYPTION OPERATION AND METHOD OF OPERATING THE SAME

(71) Applicants: SEOUL NATIONAL UNIVERSITY R&DB FOUNDATION, Seoul (KR); INDUSTRY-ACADEMIC COOPERATION FOUNDATION, CHOSUN UNIVERSITY, Gwangju (KR)

(72) Inventors: Jong Seon No, Seoul (KR); Joon Woo Lee, Seoul (KR); Young Sik Kim, Gwangju (KR)

(73) Assignees: SEOUL NATIONAL UNIVERSITY R&DB FOUNDATION (KR); INDUSTRY-ACADEMIC COOPERATION FOUNDATION, CHOSUN UNIVERSITY (KR)

( * ) Notice: Subject to any disclaimer, the term of this patent is extended or adjusted under 35 U.S.C. 154(b) by 202 days.

(21) Appl. No.: 18/105,325

(22) Filed: Feb. 3, 2023

(65) Prior Publication Data
US 2023/0254125 A1    Aug. 10, 2023

(30) Foreign Application Priority Data

Feb. 10, 2022 (KR) .......................... 10-2022-0017597
Aug. 17, 2022 (KR) .......................... 10-2022-0102556

(51) Int. Cl.
*H04L 9/08* (2006.01)
*H04L 9/00* (2022.01)

(52) U.S. Cl.
CPC ............ *H04L 9/0825* (2013.01); *H04L 9/008* (2013.01)

(58) Field of Classification Search
CPC .............................. H04L 9/0825; H04L 9/008
USPC ........................................................ 713/189
See application file for complete search history.

(56) References Cited

U.S. PATENT DOCUMENTS 10,476,847 B1 * 11/2019 Smith ................... H04L 63/102
11,425,107 B2 * 8/2022 Kravitz ................ G06F 21/6218
11,488,152 B2 * 11/2022 Gaddam ............ G06Q 20/3829
(Continued)

FOREIGN PATENT DOCUMENTS

EP          2945347 A1 * 11/2015   ........... H04L 63/062
KR   10-2005-0032614          4/2005
(Continued)

OTHER PUBLICATIONS

Yoshinori Aono; Efficient Key-Rotatable and Security-Updatable Homomorphic Encryption; ACM:2017; pp. 35-42.*
(Continued)

*Primary Examiner* — Monjur Rahim
(74) *Attorney, Agent, or Firm* — Dickinson Wright PLLC

(57) ABSTRACT

A homomorphic encryption operation key management system receives a public key and a hierarchical Galois key from a client device, verifies validity of a token in response to receiving the token and a request for a homomorphic encryption operation key for the client device from a server, and generates the homomorphic encryption operation key using the public key and the hierarchical Galois key and transmits the homomorphic encryption operation key to the server when the token is valid.

16 Claims, 4 Drawing Sheets

(56) References Cited

U.S. PATENT DOCUMENTS

| | | | |
|---|---|---|---|
| 11,706,016 B2* | 7/2023 | Su | G06N 10/20 |
| | | | 380/44 |
| 2015/0372812 A1* | 12/2015 | Parann-Nissany | H04L 63/06 |
| | | | 380/44 |
| 2016/0344557 A1* | 11/2016 | Chabanne | H04L 9/3066 |
| 2018/0150645 A1* | 5/2018 | Toshok | G06F 21/6254 |
| 2019/0190713 A1* | 6/2019 | Hirano | G09C 1/00 |
| 2020/0074112 A1* | 3/2020 | Ren | G06F 16/9027 |
| 2020/0327252 A1* | 10/2020 | McFall | G06F 21/78 |
| 2020/0358611 A1* | 11/2020 | Hoang | H04L 9/3231 |
| 2021/0120307 A1* | 4/2021 | Bastable | H04N 21/4408 |
| 2021/0314142 A1* | 10/2021 | Lai | H04L 9/3218 |
| 2021/0319128 A1* | 10/2021 | Salomon | G06F 21/6245 |
| 2021/0328766 A1* | 10/2021 | No | H04L 9/3093 |
| 2022/0014351 A1* | 1/2022 | Jung | H04L 9/008 |
| 2022/0141019 A1* | 5/2022 | Thomas | H04L 9/3213 |
| | | | 713/159 |
| 2022/0400105 A1* | 12/2022 | Nouaille | H04L 63/0435 |

FOREIGN PATENT DOCUMENTS

| | | |
|---|---|---|
| KR | 10-2006-0089008 | 8/2006 |
| KR | 10-2008-0002290 | 1/2008 |

OTHER PUBLICATIONS

Bampoulidis et al., "Privately Connecting Mobility to Infectious Diseases via Applied Cryptography," arXiv:2005.02061v3, Jan. 11, 2021, pp. 1-40.

Lee et al., "Hierarchical Galois Key Management Systems for Privacy Preserving AIaaS with Homomorphic Encryption," Conference, 2022, pp. 1-20.

Lee et al., "Authorization of Evaluation Key Generation for Homomorphic Encryption," pp. 1-6.

European Search Report for EP Application No. 23151712.9, dated Jul. 6, 2023, 9 pages.

Song et al., "Favored Encryption Techniques for Cloud Storage," 2015 IEEE First International Conference on Big Data Computing Service and Applications, Mar. 30, 2015, pp. 267-274.

Lee et al., "Hierarchical Galois Key Management Systems for Privacy Preserving AIaaS with Homomorphic Encryption," International Association for Cryptologic Research, May 10, 2022, pp. 1-20.

* cited by examiner

KEY MANAGEMENT SYSTEM FOR HOMOMORPHIC ENCRYPTION OPERATION AND METHOD OF OPERATING THE SAME

CROSS-REFERENCE TO RELATED APPLICATION

Pursuant to 35 U.S.C. § 119, this application claims the benefit of earlier filing date and right of priority to Korean Application No. 10-2022-0017597, filed on Feb. 10, 2022 and Korean Application No. 10-2022-0102556, filed on Aug. 17, 2022, the contents of which are all hereby incorporated by reference herein in their entirety.

BACKGROUND OF THE INVENTION

Field of the Invention

The present invention relates to homomorphic encryption technology, and more particularly to a method of generating an operation key for a homomorphic encryption operation in a client-server model.

Description of the Related Art

Homomorphic Encryption (HE) is an encryption method that may calculate data in an encrypted state. A result of an operation using ciphertexts becomes a new ciphertext, and a plaintext obtained by decrypting the ciphertext is the same as an operation result of original data before encryption. Homomorphic encryption may be used to store personal information in an external medium or to calculate the personal information while safely protecting the personal information. For example, when homomorphic encryption is used, data may be outsourced to a commercial cloud service in an encrypted state and processed in the encrypted state.

In homomorphic encryption, several pieces of data are encrypted into one ciphertext, and when two different ciphertexts are operated, the operation is performed between pieces of data at corresponding locations. When data at a different location within the ciphertext needs to be operated on in an encrypted state, the location needs to be shifted in some cases so that the operation can be performed. Only a homomorphic rotation operation, which is a circular shift operation in an encrypted state, is an operation for changing a location of data in a ciphertext in an encrypted state, and the homomorphic rotation operation corresponds to an essential operation in using homomorphic encryption.

FIG. 1 is a network environment of a conventional client-server model for performing a homomorphic encryption operation. Referring to FIG. 1, in the conventional client 1-server 2 model for performing the homomorphic encryption operation, the client 1 generating a ciphertext according to homomorphic encryption may generate and transmit a necessary operation key in order to request that the server 2 perform the homomorphic encryption operation on the ciphertext. For example, the client 1 may generate a rotation operation key for performing rotation operation according to homomorphic encryption using a secret key thereof and transmit the generated rotation operation key to the server 2, thereby performing rotation operation on the ciphertext in the server 2. The operation key required for homomorphic encryption may be generated from the secret key of the client 1, and thus cannot be generated in another electronic device that does not know the secret key, for example, the server 2.

SUMMARY OF THE INVENTION

Homomorphic rotation keys for performing rotation operations in homomorphic encryption occupy several hundred MB in many cases, and there are a variety of more than 100 types. Therefore, considerable costs are incurred when all rotation operation keys are generated by a client electronic device of relatively low specification compared to a server and transmitted to the server. In addition, even when the server generates a homomorphic rotation operation key, if there is actually a plurality of servers performing homomorphic encryption operations in response to a service request from a client, generating or storing all rotation operation keys for the client by each of the plurality of servers is inappropriate in terms of overall memory burden.

According to embodiments of the present disclosure, a method of generating an operation key using a public key of a client is newly proposed, and a right to generate an operation key required for a homomorphic encryption operation of a ciphertext of the client may be delegated to another electronic device. As an embodiment, it is possible to provide a homomorphic encryption operation key management system for generating and transmitting a homomorphic encryption operation key for a ciphertext of a client in response to a request from a server, and storing and managing the generated operation key.

According to embodiments of the present disclosure, it is possible to provide a homomorphic encryption operation key management system capable of immediately transmitting an operation key stored in a memory or generating an operation key only once and transmitting the generated operation key to one or more servers requesting a homomorphic encryption operation key for the same client.

In accordance with an aspect of the present invention, the above and other objects can be accomplished by the provision of a homomorphic encryption operation key management system including a communication interface configured to support communication using a security protocol, a memory, and at least one processor operatively coupled to the communication interface and the memory, in which the memory includes a token and one or more public keys received from each of a plurality of electronic devices, the at least one processor verifies validity of the token in response to the communication interface receiving a token and an operation key request from a first server, one or more homomorphic encryption operation keys are generated using the one or more public keys for a first electronic device among the plurality of electronic devices based on data obtained by decrypting the token in response to the token being valid, and the homomorphic encryption operation key for the first electronic device is transmitted to the first server through the communication interface.

When the at least one processor succeeds in decrypting the token based on an encryption method set in advance with the first electronic device, the at least one processor may determine that the token is valid.

The token may encrypt and include at least one of a user identity of the first electronic device, allowed operation time information, a type and range of an operation key allowed to be generated, or a random nonce issued by the first electronic device.

When a request time for the operation key is outside an allowed range based on the allowed operation time information, the at least one processor may not generate the homomorphic encryption operation key, and may transmit a message for suspending use of the homomorphic encryption operation key to the first server through the communication interface.

The at least one processor may verify whether the token is valid by checking the random nonce according to a type of operation key request of the first server.

The one or more public keys may include a hierarchical Galois key corresponding to a k-step shift, and the at least one processor may generate one or more homomorphic rotation operation keys corresponding to the k-step shift by repeatedly performing a rotation operation using the hierarchical Galois key.

The at least one processor may store the homomorphic rotation operation key in the memory, and set a storage period of the homomorphic rotation operation key according to content negotiated with the first electronic device.

The at least one processor may transmit the operation key stored in the memory to the first server in response to searching the memory for the requested operation key for the first electronic device.

In accordance with another aspect of the present invention, there is provided a method of managing a homomorphic encryption operation key, the method including receiving a token and a request for a homomorphic encryption operation key from a first server, verifying validity of the token, and generating the homomorphic encryption operation key using one or more public keys for a first electronic device identified based on data obtained by decrypting the token when validity has been proved, and transmitting the homomorphic encryption operation key to the first server.

The method may further include transmitting a message indicating that the token is invalid to the first server when the token is invalid.

The one or more public keys may include a hierarchical Galois key generated using a secret key of the first electronic device.

The generating may include generating one or more homomorphic rotation operation keys by repeatedly performing a rotation operation using the hierarchical Galois key.

The verifying may include determining that validity is proved when the token is decrypted using an encryption method preset with the first electronic device.

The token may encrypt and include at least one of a user identity of the first electronic device, allowed operation time information, a type and range of an operation key allowed to be generated, or a random nonce issued by the first electronic device.

The generating may include transmitting a message for suspending use of the homomorphic encryption operation key to the first server without generating the homomorphic encryption operation key when a request time for the operation key is outside an allowed range based on the allowed operation time information.

The verifying may include checking the random nonce according to a type of operation key request of the first server, and the homomorphic encryption operation key may be generated in response to a case where the token is valid.

The method may further include setting a storage period of the homomorphic encryption operation key according to content negotiated with the first electronic device, and storing the homomorphic encryption operation key in a memory.

In accordance with a further aspect of the present invention, there is provided a computer-readable non-transitory recording medium storing an instruction for controlling an electronic device including at least one processor, a memory, and a communication interface, in which, when the instruction is executed by the at least one processor, the instruction controls the electronic device so that a request for a homomorphic encryption operation key and a first token for a first electronic device are received from a first server, the first token is decrypted based on a first encryption method for the first electronic device stored in the memory, the memory is searched for the homomorphic encryption operation key in response to the decryption being successful, the homomorphic encryption operation key is transmitted to the first server in response to the homomorphic encryption operation key being searched for, and a homomorphic rotation operation key is generated using a public key and a hierarchical Galois key of the first electronic device stored in the memory and transmitted to the first server in response to not searching the memory for the homomorphic encryption operation key.

The generating of the homomorphic rotation operation key may be generating one or more homomorphic rotation operation keys by repeatedly performing a rotation operation on the public key using the hierarchical Galois key.

The generating of the homomorphic rotation operation key may be generating the homomorphic rotation operation key based on data obtained by decrypting the token, and the decrypted data may include at least one of a user identity of the first electronic device, allowed operation time information, a type and range of an operation key allowed to be generated, or a random nonce issued by the first electronic device.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
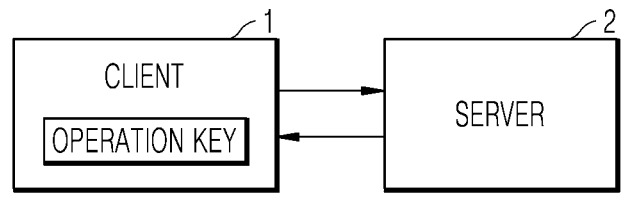
FIG. 1 is a network environment of a conventional client-server model for performing a homomorphic encryption operation.

Hereinafter, embodiments will be described in detail with reference to the accompanying drawings. However, the scope of rights is not limited or restricted by these embodiments. Like reference numerals in each figure indicate like elements.

General and universal terms in the related technical field have been selected as terms used in the description below.

However, there may be other terms depending on the development and/or change of technology, preference of conventional technicians, etc. Therefore, the terms used in the description below should not be construed as limiting the technical idea, and should be understood as exemplary terms for describing the embodiments.

Figure 2:
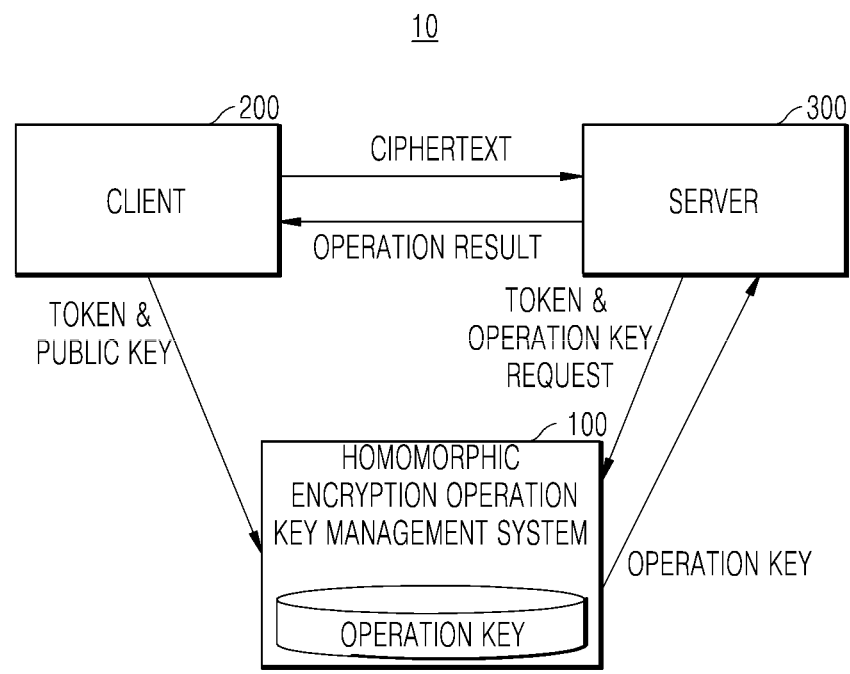
FIG. 2 is a network environment of a client-server model including a homomorphic encryption operation key management system according to an embodiment.

FIG. 2 is a network environment of a client 200-server 300 model 10 including a homomorphic encryption operation key management system 100 according to an embodiment.

For a homomorphic encryption operation, several GB to several hundred GB of operation keys (for example, rotation operation keys, key switching keys, etc.) are required for each client. Generating, storing, and transmitting all operation keys, each of which is a type of public key, from the client to the server, to which an operation is delegated, causes a cost problem in a relatively low-specification client. For example, in a portable device such as a mobile device, even when the key size is 1 GB, it is difficult to bear the computational cost of generating and storing the key, as well as the communication cost of transmitting the key to the server. In addition, when one or more servers perform an AI operation including a homomorphic encryption operation by proxy, it is burdensome in terms of communication cost and overall memory to receive and store, for each server, keys required for the operation for each client. The homomorphic encryption operation key management system 100 according to various embodiments of the present disclosure may generate an operation key on behalf of the client 200, store the operation key, and transmit the operation key to an operation server if necessary. Accordingly, both the computational burden of generating the operation key and the communication cost of delivering the operation key to the server of the client 200 may be reduced, and when there are several operation servers, it is possible to reduce the memory burden of storing the operation key for each server.

The homomorphic encryption operation key management system 100 according to an embodiment may store the public key (operation key) received from the client 200, generate a derived key (another operation key) based on the stored public key, and transmit the stored public key and derived keys to the server 300 requiring the homomorphic encryption operation in relation to the client 200. When the client 200 generates a public key (for example, a hierarchical Galois key) only once for the first time and transmits the public key to the homomorphic encryption operation key management system 100, operation keys (for example, a plurality of rotation operation keys) required for the homomorphic encryption operation may be generated by the homomorphic encryption operation key management system 100. For example, the homomorphic encryption operation key management system 100 may receive, from one or more clients 200, a hierarchical Galois key (public key) capable of generating a rotation operation key for the homomorphic encryption rotation operation. In response to receiving a rotation operation key request from the server 300 in relation to the one or more clients 200 managed by the homomorphic encryption operation key management system 100, the homomorphic encryption operation key management system 100 may generate a plurality of rotation operation keys (derived keys) from the hierarchical Galois key (public key) for the corresponding client 200. There may be one or more public keys, and the homomorphic encryption operation key management system 100 may generate each derived key using, for example, one or more hierarchical Galois keys. The homomorphic encryption operation key management system 100 may store both the public key (one or more hierarchical Galois keys) and the derived key (a plurality of rotation operation keys) in the memory for the client 200. In an embodiment, the homomorphic encryption operation key management system 100 may store the public key at all times, and store the derived key only for a certain period of time or for a set period of time according to selection of a user. The homomorphic encryption operation key management system 100 may transmit the derived key stored in the memory to the server 300 in response to an operation key request with respect to the client 200, and regenerate a derived key and transmit the regenerated derived key to the server 300 when the derived key is deleted from the memory. In this instance, when the same operation key is regenerated, a time required to transmit the operation key to the server 300 may be delayed as much as the time required for key generation, and thus the client 200 may request that the homomorphic encryption operation key management system 100 store the derived key for a necessary period. For efficient memory management, the homomorphic encryption operation key management system 100 may charge a cost in proportion to the amount of memory used for each client 200.

The server 300 requesting an operation key in relation to the client 200 may be an operation server that receives a ciphertext transmitted by the client 200 and performs a homomorphic encryption operation on the received ciphertext. For example, the server 300 may be an AI server. The server 300 may transmit a token received from the client 200 and data on a type of necessary operation key to the homomorphic encryption operation key management system 100 in order to perform a homomorphic encryption operation on the ciphertext of the client 200. The homomorphic encryption operation key management system 100 may transmit the operation key of the client 200 to the server 300 when validity is proved after verifying the token. At this time, when the operation key requested by the server 300 is previously generated and stored in a cache, the homomorphic encryption operation key management system 100 may immediately transmit the stored operation key to the server 300. Otherwise, the homomorphic encryption operation key management system 100 may generate a requested derived key using the public key of the client 200 and transmit the derived key to the server 300. The homomorphic encryption operation key management system 100 may store the generated derived key in the cache of the client 200. A user who uses a large amount of storage space due to a large number of requests for operation keys may be regarded as a user who actively uses the homomorphic encryption operation key management system 100, and a charging calculation algorithm for differentiating charging according to a degree of use of the storage space may be utilized.

The homomorphic encryption operation key management system 100 may register a new client 200 to which operation key generation is delegated. The homomorphic encryption operation key management system 100 may receive and store user information of the client 200 and a public key for a homomorphic operation.

The homomorphic encryption operation key management system 100 may communicate with the client 200 and the server 300 using an encryption channel or an authentication channel. For example, the homomorphic encryption operation key management system 100 may receive user information and a public key from the client 200 requesting a new registration, receive a request for an operation key from the server 300, or use a security protocol such as Transport Layer Security (TLS) or Internet Protocol Security (IPSec) in all processes of transmitting the operation key. The homomorphic encryption operation key management system 100 may prevent a denial-of-service attack or a replay attack by an external attacker due to key exposure or key contamination during communication with the client 200 and server 300 using the security protocol.

The homomorphic encryption operation key management system 100 may manage an operation key for each of a plurality of clients 200, a type, number, or capacity of derived keys for each client 200 are different, and there may be a plurality of servers 300 associated with the plurality of clients 200. For example, the homomorphic encryption operation key management system 100 may correspond to a large number of AIaaS servers 300. The client 200 may use a service using homomorphic encryption from various operation servers 300 irrespective of data transmission capability or storage space limit thereof. For example, a smartphone terminal 200 may use a secure AIaaS server 300 using the homomorphic operation by using the homomorphic encryption operation key management system 100 through encryption/token issuance, etc. without storing or delivering a key of several GB. In various embodiments, when the client 200 requests a service from the server 300, a right to use the homomorphic encryption operation key management system 100 may be granted by using a token.

In the present disclosure, the token may include information on a right to use the operation key between the client 200 and the server 300. The token is transmitted and received by being encrypted, and only the client 200 issuing the token and the homomorphic encryption operation key management system 100 to which operation key generation is delegated from the client 200 may decrypt the token. The server 300 may receive the token and transmit the token to the homomorphic encryption operation key management system 100, and cannot decrypt the encrypted content. The homomorphic encryption operation key management system 100 may decrypt the token using a method previously agreed upon with the client 200. For example, the homomorphic encryption operation key management system 100 may decrypt the token using a secret key/public key code agreed upon with the client 200.

The token may include user identity information of the client 200. The user identity information may include client 200 identification information, user identification information, and authentication information. The token may include information about a time allowed for an operation by the client 200. In the case of corresponding to a time before or after a limit range according to the time information allowed for the operation, the homomorphic encryption operation key management system 100 may determine that the token is a retransmission token, suspend use of a key for the corresponding server, and transmit a key use suspension message due to expiration of the period to the server. The token may include an authorized key ID and an allowable range. For example, a range or number of rotation operation keys may be limited. Since one or more keys for each client may be stored in the homomorphic encryption operation key management system 100, ID information assigned to the key may be included to distinguish the corresponding key. The token may include a random nonce issued by the client 200. The random nonce may be utilized for additional authentication, for example, in a process of requesting important information for the homomorphic operation on the ciphertext of the client 200 by the operation server and the homomorphic encryption operation key management system 100.

Even though FIG. 2 illustrates only one client 200 and one server 300, the homomorphic encryption operation key management system 100 according to various embodiments of the present disclosure may operate with a plurality of clients 200 and a plurality of servers 300. In various embodiments, the homomorphic encryption operation key management system 100 may receive a token and a public key for each of the plurality of clients 200, and manage a homomorphic encryption operation key for each of the plurality of clients 200. In various embodiments, the homomorphic encryption operation key management system 100 may receive a request for an operation key for a specific client 200 among the plurality of clients 200 from the plurality of servers 300, and provide a homomorphic encryption operation key for the corresponding client 200. As an embodiment, in FIG. 6, a description has been given of an example in which one homomorphic encryption operation key management system 100 operates with two clients 200a and 200b and two servers 300a and 300b.

In an embodiment, the client 200 may generate a hierarchical Galois key as follows.

The client 200 may define different sets of prime numbers $C=\{q_0, \ldots, q_L\}$ and $B=\{p_0, \ldots, p_{k-1}\}$. All these sets may be used as variables (basis) of a residue number system (RNS). The client 200 may define another set of prime numbers $M=\{t_0, \ldots, t_{\bar{k}-1}\}$ as master special prime numbers. When $$Q = \prod_i q_i, \ P = \prod_i p_i, \ T = \prod_i t_i$$

for convenience of description, names may be re-named in order as $C \cup B = \{\overline{q_0}, \ldots, \overline{q_{L+K}}\}$.

A decomposition number dnum is $=(L+1)/\text{dnum}$, and the client 200 may define a value obtained by collecting and multiplying prime numbers as $$\{Q_j\}_{0 \leq j < dnum} = \left\{ \prod_{i=j\alpha}^{(j=1)\alpha-1} q_i \right\}.$$

The client 200 may define $$\hat{Q}_i = \prod_{j \neq i} Q_i$$

and allow $|P| \geq \max(Q_j)$ to be satisfied.

A master decomposition number mdnum is $\alpha_m = (L+1)/\text{mdnum}$, and a value obtained by collecting and multiplying prime numbers may be defined as $$\{\overline{Q_J}\}_{0 \leq j < mdnum} = \left\{ \prod_{i=j\alpha_m}^{(j+1)\alpha_m-1} \bar{q}_i \right\}.$$

The client 200 may define $$\hat{\overline{Q}}_i = \prod_{j \neq i} \overline{Q}_i,$$

and allow $|T| \geq \max(\overline{Q}_j)$ to be satisfied.

The client 200 may define a rotation key corresponding to k for a secret key polynomial s as $mswk_k = \{mswk_{k,i}\}_{i=0,\ldots,mdnum-1}$, where $mswk_{k,i} = (\overline{b_{k,i}}, \overline{a_{k,i}}) \in R_{PQT}^2$, $\overline{a_{k,i}}$ is extracted from a uniform distribution in $R_{PQT}$, and $\overline{b_{k,i}} = -\overline{a_{k,i}}s + \overline{e_{k,i}} + T \cdot \widehat{Q_i} \cdot [\widehat{Q_i}^{-1}]_{Q_i} \cdot s(X^{5^k})$. The client 200 may generate each of hierarchical Galois keys for $k=1,-1,2,-2, 4,-4, \ldots, -2^{n-2}, 2^{n-2}, 2^{n-1}$. The value k is an example, and may be determined as a value such that values from $-2^{n-1}$ to $2^{n-1}$ are obtained by a sum of combinations allowing repetition. The hierarchical Galois key has the form of $(b_e, a_e) \in R_{PQ}^2$, and may be defined so that $\alpha^e$ is an element uniformly extracted from $R_{PQ}^2$, and $b_e = -a_e s + e_e$.

The client 200 may generate a plurality of rotation operation keys by repeatedly performing a rotation operation on the public key using the hierarchical Galois key. The hierarchical Galois key may be generated in response to a k-step shift, and may be generated by the client 200 at the request of the server 300 or the homomorphic encryption operation key management system 100. The client 200 may generate a plurality of rotation operation keys corresponding to multiples of the k-step shift by using the hierarchical Galois key corresponding to the k-step shift. The client 200 may generate one or more hierarchical Galois keys corresponding to different step shifts. The one or more hierarchical Galois keys may generate a plurality of rotation operation keys corresponding to different step shifts, respectively. In various embodiments, when a hierarchical Galois key set includes Galois keys corresponding to $k=\{1, -1, 2, -2, 4, -4, 8, -8\}$, the client 200 may generate a rotation operation key by combining k different Galois keys. For example, the client 200 may sequentially use a Galois key corresponding to $k=8$ and a Galois key corresponding to $k=2$ to generate a rotation operation key for a 10-step shift.

In an embodiment, the homomorphic encryption operation key management system 100 may generate one or more rotation operation keys using the hierarchical Galois key of the client 200 as follows.

When a rotation key of l can be generated, the homomorphic encryption operation key management system 100 may define $l = l_0 + l_1 + 0 \ldots + l_{u-1}$, where each $l_i$ is a value for which a hierarchical Galois key exists. The homomorphic encryption operation key management system 100 may first generate a rotation operation key of $l_0$ using a hierarchical Galois key of $l_0$ in an encryption key (public key). The homomorphic encryption operation key management system 100 performs a rotation operation by $mswkl_0$ on $(b_e, a_e + P \cdot \hat{Q}_r$ $[\hat{Q}_r^{-1}]_{Q_r}$ to generate $swk_{l_0,r}$ and performs this operation on $r=0, \ldots,$ dnum–1 using such a method. As a result, $swk_{l_0} = \{swk_{l_0,r}\}_{r=0,\ldots,dnum-1}$ is generated, and the rotation operation key of $l_0$ is generated. In addition, the homomorphic encryption operation key management system 100 may generate $swk_{k^{(j)}} = \{swk_{k^{(j)},r}\}_{r=0,\ldots,dnum-1}$, which is a rotation operation key for $k^{(j)} = l_0 + l_1 + \ldots + l_j$, from $swk_{k^{(j-1)}} = \{swk_{k^{(j-1)},r}\}_{r=0,\ldots,dnum-1}$, which is a rotation operation key for $k^{(j-1)} = l_0 + l_1 + \ldots + l_{j-1}$.

The homomorphic encryption operation key management system 100 may generate $swk_{k^{(j)},r}$ by applying a rotation operation by $l_j$ using $mswkl_j$ to a ciphertext $swk_{k^{(j-1)},r}$, and may perform this operation for all of $r=0, \ldots,$ dnum–1. As a result, $swk_{k^{(j)}} = \{swk_{k^{(j)},r}\}_{r=0,\ldots,dnum-1}$ may be generated and become a rotation operation key of $k^{(j)}$. The homomorphic encryption operation key management system 100 may perform the above process for all of $l_0, l_1, \ldots, l_{u-1}$ to generate a rotation operation key for l.

Figure 3:
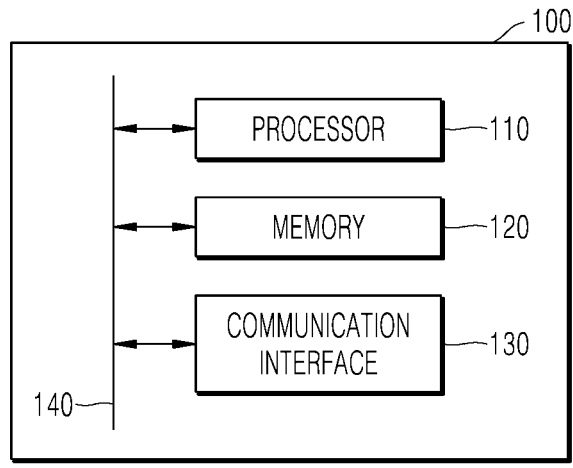
FIG. 3 is a block diagram including components of a homomorphic encryption operation key management system according to an embodiment.

FIG. 3 is a block diagram including components of the homomorphic encryption operation key management system 100 according to an embodiment.

The homomorphic encryption operation key management system 100 according to the embodiment may include a processor 110, a memory 120, a communication interface 130, and a bus 140.

The processor 110 is a type of central processing unit, and may execute one or more instructions stored in the memory 120 to control an operation of the homomorphic encryption operation key management system 100. The processor 110 may include any type of device capable of processing data. For example, the processor 110 may refer to a data processing device embedded in hardware having a physically structured circuit to perform a function expressed as code or an instruction included in a program. As an example of the data processing device embedded in the hardware as described above, it is possible to include a processing device such as a microprocessor, a central processing unit (CPU), a processor core, a multiprocessor, an application-specific integrated circuit (ASIC), or a field programmable gate array (FPGA). However, the present invention is not limited thereto. The processor 110 may include one or more processors. The processor 110 may include at least one core.

The processor 110 may verify validity of the token in response to the token and the operation key request received from the server 300, and generate one or more homomorphic encryption operation keys using one or more public keys based on data obtained by decrypting the token in response to the token being valid. The processor 110 may decrypt the token received from the server 300 based on an encryption method set in advance with the client 200, and determine that the token is valid when decryption is successful. The token may encrypt and include at least one of a user identity of the client 200, allowed operation time information, a type and range of an operation key allowed to be generated, or a random nonce issued by the client 200. When a request time for the operation key by the server 300 is outside an allowed range based on the allowed operation time information included in the token, the processor 110 may not generate the homomorphic encryption operation key, and may transmit a message for suspending use of the operation key to the server 300. The processor 110 may determine whether the token is valid by further checking the random nonce according to a type of operation key request from the server 300. One or more public keys received from the client 200 may include a hierarchical Galois key corresponding to a k-step shift, and the processor 110 may generate one or more homomorphic rotation operation keys corresponding to k-step shift by repeatedly performing a rotation operation using the hierarchical Galois key.

The hierarchical Galois key is a type of public key capable of generating an operation key (evaluation key) for a rotation operation of a homomorphic ciphertext. The hierarchical Galois key may include one or more Galois keys. The hierarchical Galois key including one or more Galois keys may be referred to as a hierarchical Galois key or a hierarchical Galois key set for convenience of description. For example, the hierarchical Galois key may include a Galois key corresponding to a k-step shift. Since the key is a type of public key, the processor 110 may generate an operation key for the rotation operation using the received hierarchical Galois key without knowing a secret key of the client 200.

In various embodiments, the processor 110 may generate a plurality of rotation operation keys capable of performing step shift corresponding to a multiple of k by using the Galois key corresponding to a k-step shift. As an example, when the hierarchical Galois key is a Galois key corresponding to k=1, the Galois key corresponding to k=1 may be used 13 times to generate a rotation operation key for a 13-step shift. As another example, when a hierarchical Galois key set includes Galois keys corresponding to k={1, −1, 2, −2, 4, −4, 8, −8}, a Galois key corresponding to k=8, a Galois key corresponding to k=4, and a Galois key corresponding to k=1 may be sequentially used to generate a rotation operation key for a 13-step shift.

In various embodiments, the client 200 may generate a hierarchical Galois key set including one or more Galois keys and transmit the hierarchical Galois key to the homomorphic encryption operation key management system 100. Alternatively, the homomorphic encryption operation key management system 100 may first request a necessary hierarchical Galois key set from the client 200.

The processor 110 may store the homomorphic rotation operation key generated using the hierarchical Galois key in the memory 120, and may set a period for storage in the memory according to content negotiated with the client 200. In response to a request for an operation key from the server 300, the processor 110 may first search the memory 120 for the operation key, and may immediately transmit the operation key to the server 300 when the operation key is stored. When the operation key is not found in the memory 120, the processor 110 may generate an operation key using one or more public keys of the client 200.

The memory 120 may include an internal memory and/or an external memory, and may include a volatile memory such as a DRAM, an SRAM, or an SDRAM, a nonvolatile memory such as a one time programmable ROM (OTPROM), a PROM, an EPROM, an EEPROM, a mask ROM, a flash ROM, a NAND Flash memory, or a NOR flash memory, a flash drive such as an SSD, a compact flash (CF) card, an SD card, a Micro-SD card, a Mini-SD card, an Xd card, or a memory stick, or a storage device such as an HDD. The memory 120 may include magnetic storage media or flash storage media. However, the present invention is not limited thereto.

In an embodiment, the memory 120 may store client 200 information, and the client 200 information may include a token received from the client 200, one or more public keys, and a derived key (one or more operation keys) generated by the processor 110. The memory 120 may store the derived key for a predetermined period, and may delete the corresponding derived key when the predetermined period elapses.

The communication interface 130 may include one or more communication interfaces for providing wired or wireless communication. In various embodiments, the communication interface 130 may transmit and receive a key and a token through a secure channel or an authentication channel using a secure protocol. For example, the communication interface 130 may use Transport Layer Security (TLS) or Internet Protocol Security (IPSec). The communication interface 130 may prevent a denial-of-service attack or a replay attack by an external attacker due to key exposure or key contamination during communication with the client 200 and the server 300.

The bus 140 is a logical/physical path connecting the processor 110, the memory 120, and the communication interface 130. For example, the processor 110 may perform reading and writing with respect to the memory 120 through the bus 130.

Figure 4:
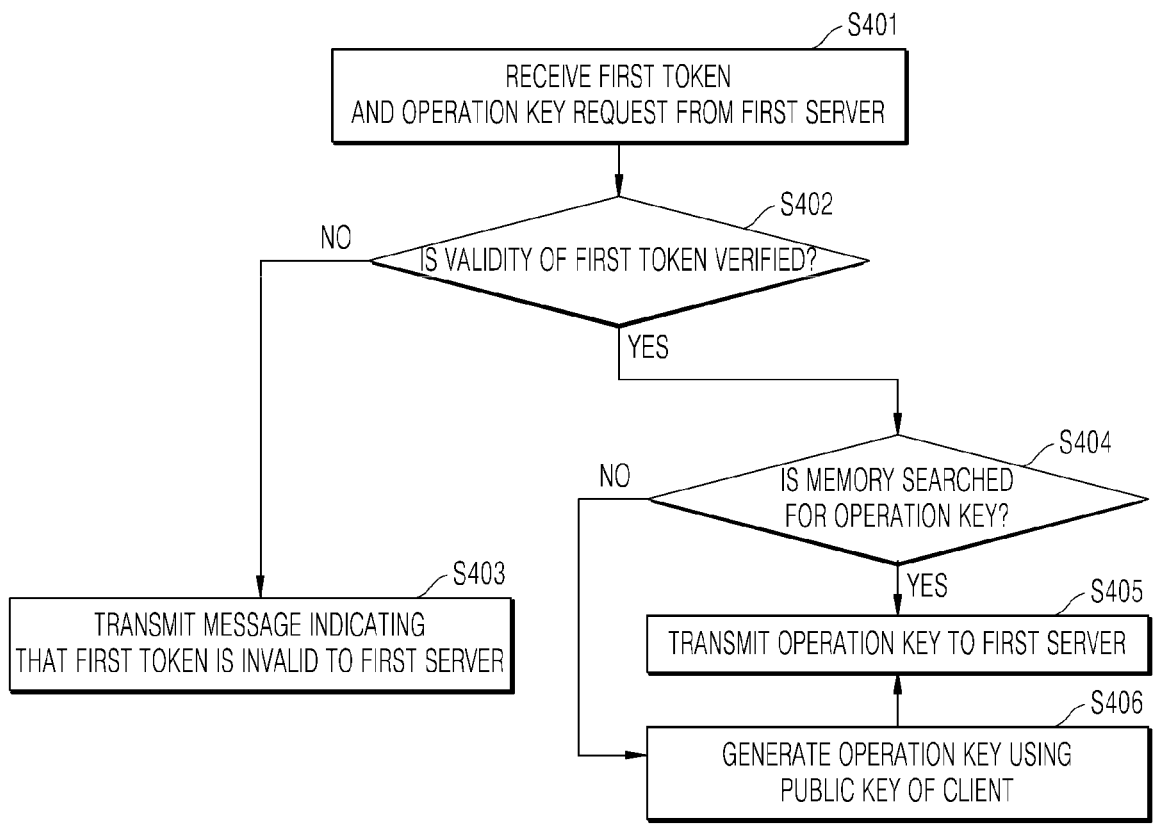
FIG. 4 is a flowchart of a method of managing a homomorphic encryption operation key in a client-server model according to an embodiment.

FIG. 4 is a flowchart of a method of managing a homomorphic encryption operation key in a client-server model according to an embodiment.

In step S401, the homomorphic encryption operation key management system 100 may receive a first token and an operation key request from a first server 300. The operation key request may include information on a type and number of required operation keys. The first token may be decrypted in an encrypted state according to an encryption method set in advance with the client 200.

In step S402, the homomorphic encryption operation key management system 100 may verify validity of the received first token. When the homomorphic encryption operation key management system 100 succeeds in decrypting the first token according to the encryption method set in advance with the client 200, the homomorphic encryption operation key management system 100 may determine that the first token is valid. Otherwise, the homomorphic encryption operation key management system 100 may determine that the first token is invalid, and transmit a message indicating that the first token is invalid to the first server in step S403 without searching for or generating the operation key.

In step S404, the homomorphic encryption operation key management system 100 may search the memory 120 for the operation key. When the operation key is found, the homomorphic encryption operation key management system 100 may immediately transmit the found operation key to the first server 300 (step S405).

In step S406, the homomorphic encryption operation key management system 100 may generate an operation key using one or more public keys of the client 120 corresponding to the first token in response to the operation key not found in the memory 120. The homomorphic encryption operation key management system 100 may transmit the generated operation key to the first server 300 (step S405).

Figure 5:
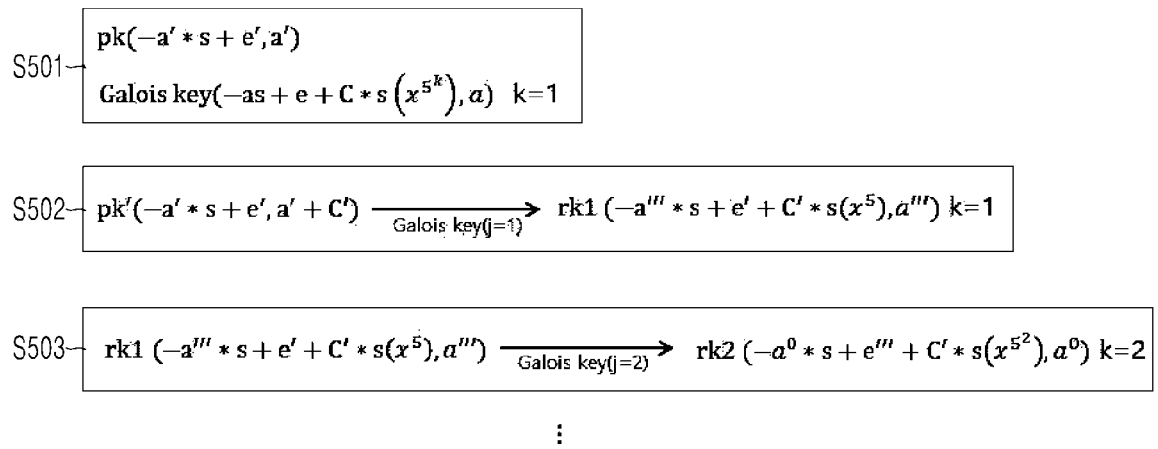
FIG. 5 is an example of a method of generating a homomorphic rotation operation key in the homomorphic encryption operation key management system according to an embodiment.

FIG. 5 is an example of a method of generating a homomorphic rotation operation key in the homomorphic encryption operation key management system 100 according to an embodiment.

In an embodiment, the homomorphic encryption operation key management system 100 may generate a plurality of homomorphic rotation operation keys using one or more public keys received from the client 20. The one or more public keys may include a public key generated using a secret key of the client 200 and one or more hierarchical Galois keys. A public key for a homomorphic encryption operation may be expressed as a polynomial.

In step S501, the homomorphic encryption operation key management system 100 may receive one or more public keys (for example, pk and MRkey) from the client 200.

The public key pk may be defined as a secret key s, a polynomial "a" uniformly and randomly extracted from a set of a finite number of polynomials, a small error e, and a large constant C.

The hierarchical Galois key (MRkey) is a type of public key, and may be defined as a secret key s, a polynomial "a" uniformly and randomly extracted from a set of a finite number of polynomials, a small error e, and a large constant C in response to a k-step shift.

In step S502, the homomorphic encryption operation key management system 100 may partially transform the public key pk to generate pk', and perform a rotation operation on the transformed public key pk' using the hierarchical Galois key (MRkey), thereby generating a rotation operation key rk1 corresponding to k=1.

In step S503, the homomorphic encryption operation key management system 100 may perform a rotation operation on the rotation operation key rk1 generated in step S502 using the hierarchical Galois key (MRkey), thereby generating a rotation operation key rk2 corresponding to k=2.

The homomorphic encryption operation key management system 100 may generate a plurality of rotation operation keys by repeatedly performing a rotation operation using the hierarchical Galois key (MRkey), and when the hierarchical Galois key (MRkey) corresponds to a k-step shift, the plurality of generated rotation operation keys may correspond to multiples of the k-step shift.

Figure 6:
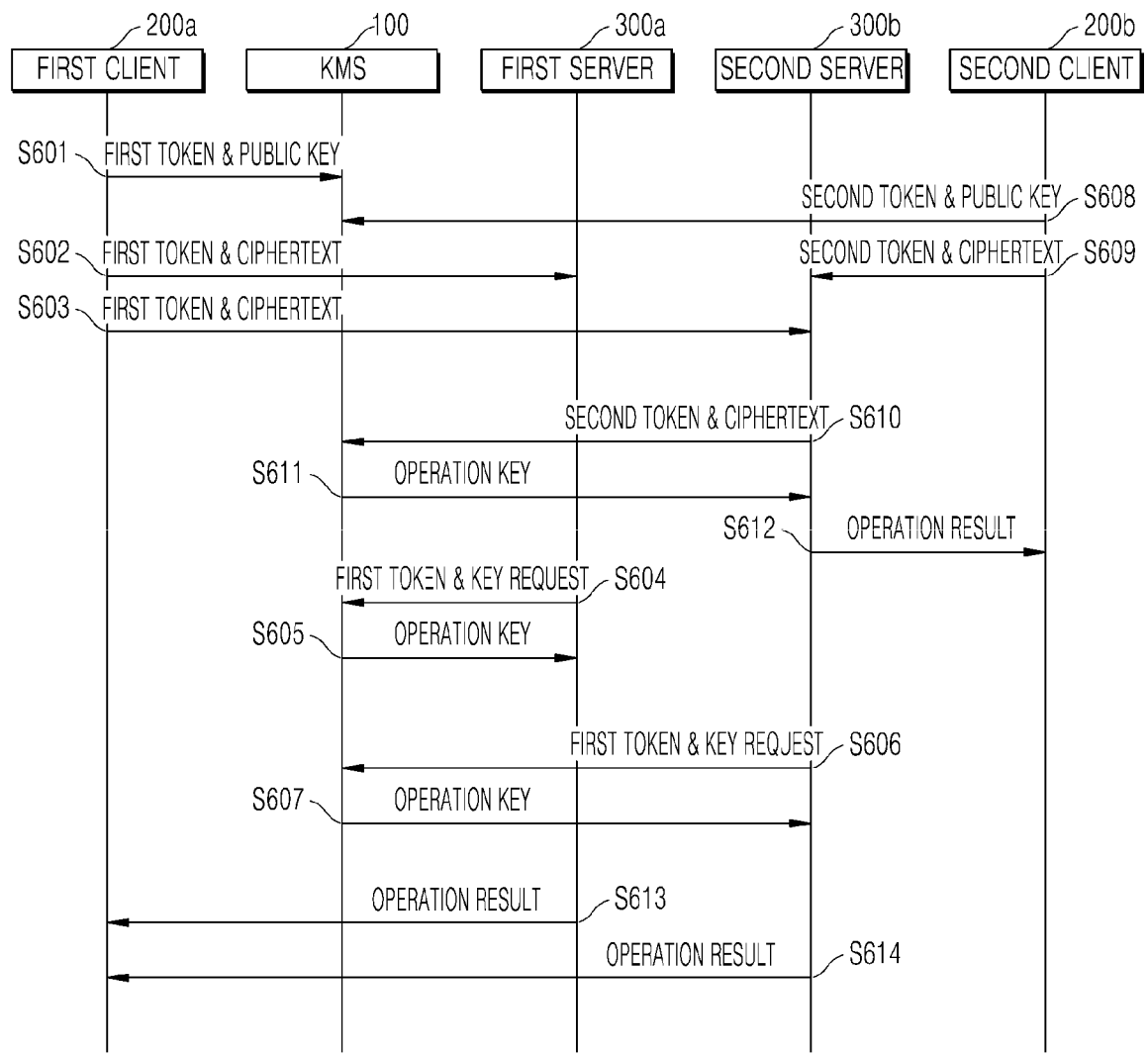
FIG. 6 is a sequence diagram in which the homomorphic encryption operation key is requested and received by a plurality of clients and a plurality of servers according to an embodiment.

FIG. 6 is a sequence diagram in which the homomorphic encryption operation key is requested and received by a plurality of clients and a plurality of servers according to an embodiment. The plurality of clients 200a and 200b according to an embodiment may request an operation from the plurality of servers 300a and 300b, and delegate generation of a homogeneous encryption operation key to the homomorphic encryption operation key management system (KMS, key management system, 100).

The first client 200a may transmit a first token and a public key to the KMS 100 to delegate generation of the homomorphic encryption operation key (step S601). The first client 200a may transmit the first token and a ciphertext while requesting a service from the first server 300a and the second server 300b (steps S602 and S603). When a necessary operation key occurs during a homomorphic encryption operation, the first server 300a may transmit the first token and necessary key information to the KMS 100 in order to request the necessary operation key (S604). For example, the KMS 100 may verify validity of the first token according to a step of FIG. 4, and may transmit the operation key to the first server 300a when validity has been proved (step S605). When a necessary operation key occurs during the homomorphic encryption operation, the second server 300b may transmit the first token and necessary key information to the KMS 100 in order to request the necessary operation key (S606). For example, the KMS 100 may verify validity of the first token according to a step of FIG. 4, and may transmit the operation key to the second server 300b when validity has been proved (step S607). When the second server 300b requests the same operation key generated by the KMS 100 according to a request from the first server 300a, the KMS 100 may immediately transmit the operation key stored in the memory to the second server 300b without the need to regenerate the operation key (step S607).

The second client 200b may transmit a second token and a public key to the KMS 100 to delegate generation of the homomorphic encryption operation key (step S608). The second client 200b may transmit the second token and a ciphertext while requesting a service from the second server 300b (step S609). When a necessary operation key occurs during the homomorphic encryption operation, the second server 300b may transmit the second token and necessary key information to the KMS 100 in order to request the necessary operation key (S610). For example, the KMS 100 may verify validity of the second token according to a step of FIG. 4, and may transmit the operation key to the second server 300b when validity has been proved (step S611).

When the homomorphic encryption operation is completed, the first server 300a and the second server 300b may each transmit service information including an operation result to each of the clients 200a and 200b (steps S612, S613, and S614).

The first token and the second token are different from each other, are each transmitted to each of the servers 300a and 300b in an encrypted state, and may be decrypted only by the KMS 100 to which a right to generate the operation key is delegated by the clients 200a and 200b.

The embodiments described above may be implemented by a hardware component, a software component, and/or a combination of the hardware component and the software component. For example, the devices, methods, and components described in the embodiments may be implemented using one or more general-purpose or special-purpose computers such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications running on the operating system. In addition, the processing device may access, store, manipulate, process, and generate data in response to execution of software. For convenience of understanding, even though one processing device is described as being used in some cases, one of ordinary skill in the art will recognize that the processing device may include a plurality of processing elements and/or a plurality of types of processing elements. For example, the processing device may include a plurality of processors or one processor and one controller. In addition, it is possible to adopt another processing configuration such as a parallel processor.

Software may include a computer program, code, an instruction, or a combination of one or more thereof, and may configure a processing device to operate as desired or independently or collectively instruct the processing device. The software and/or data may be permanently or temporarily embodied in a type of machine, component, physical device, virtual equipment, computer storage medium or device, or transmitted signal wave in order to be interpreted by the processing device or to provide an instruction or data to the processing device. The software may be distributed over a networked computer system and stored or executed in a distributed manner. The software and data may be stored in one or more computer-readable recording media.

The method according to the embodiment may be implemented in the form of a program instruction that can be executed through various computer means and recorded in a computer-readable medium. The computer-readable medium may include a program instruction, a data file, a data structure, etc. alone or in combination. The program instruction recorded in the medium may be specially designed and configured for the embodiment, or may be known and used by those skilled in the art of computer software. Examples of the computer-readable recording medium include magnetic media such as a hard disk, a floppy disk, and a magnetic tape, optical media such as a CD-ROM and a DVD, magneto-optical media such as a floptical disk, and hardware devices specially configured to store and execute program instructions, such as a ROM, a RAM, a flash memory, etc. Examples of the program instruction include not only machine language code such as that generated by a compiler, but also high-level language code that can be executed by a computer using an interpreter, etc. The hardware devices described above may be configured to operate as one or more software modules to perform operations of the embodiments, and vice versa.

According to various embodiments of the present disclosure, the client may reduce calculation and communication costs by delegating operation key generation to the homomorphic encryption operation key management system and transmitting only the ciphertext to the server without the need to directly generate the operation key required for the homomorphic encryption operation.

According to various embodiments, the homomorphic encryption operation key management system may efficiently manage the large-capacity operation key by generating the homomorphic encryption operation key of the client at the request of the legitimate server, and storing or deleting the homomorphic encryption operation key in or from the memory as necessary.

As described above, even though the embodiments have been described with reference to the limited embodiments and drawings, various modifications and variations are possible by those skilled in the art from the above description. For example, an appropriate result may be achieved even when the described techniques are performed in an order different from that of the described method, and/or the described components of the system, structure, device, circuit, etc. are combined or associated in a form different from that in the described method, or replaced or substituted by other components or equivalents. Therefore, other implementations, other embodiments, and equivalents to the claims are also within the scope of the following claims.

What is claimed is:

1. A homomorphic encryption operation key management system comprising:
    a communication interface configured to support communication using a security protocol;
    a memory; and
    at least one processor operatively coupled to the communication interface and the memory, wherein:
    the memory includes a token and one or more public keys received from each of a plurality of electronic devices;
    the at least one processor verifies validity of the token in response to the communication interface receiving a token and an operation key request from a first server;
    one or more homomorphic encryption operation keys are generated using the one or more public keys for a first electronic device among the plurality of electronic devices based on data obtained by decrypting the token in response to the token being valid; and
    the homomorphic encryption operation key for the first electronic device is transmitted to the first server through the communication interface,
    wherein the one or more public keys include a hierarchical Galois key corresponding to a k-step shift; and
    the at least one processor generates one or more homomorphic rotation operation keys corresponding to the k-step shift by repeatedly performing a rotation operation using the hierarchical Galois key.

2. The homomorphic encryption operation key management system according to claim 1, wherein, when the at least one processor succeeds in decrypting the token based on an encryption method set in advance with the first electronic device, the at least one processor determines that the token is valid.

3. The homomorphic encryption operation key management system according to claim 1, wherein the token encrypts and includes at least one of a user identity of the first electronic device, allowed operation time information, a type and range of an operation key allowed to be generated, or a random nonce issued by the first electronic device.

4. The homomorphic encryption operation key management system according to claim 3, wherein, when a request time for the operation key is outside an allowed range based on the allowed operation time information, the at least one processor:
    does not generate the homomorphic encryption operation key; and
    transmits a message for suspending use of the homomorphic encryption operation key to the first server through the communication interface.

5. The homomorphic encryption operation key management system according to claim 3, wherein the at least one processor verifies whether the token is valid by checking the random nonce according to a type of operation key request of the first server.

6. The homomorphic encryption operation key management system according to claim 1, wherein the at least one processor stores the homomorphic rotation operation key in the memory, and sets a storage period of the homomorphic rotation operation key according to content negotiated with the first electronic device.

7. The homomorphic encryption operation key management system according to claim 1, wherein the at least one processor transmits the operation key stored in the memory to the first server in response to searching the memory for the requested operation key for the first electronic device.

8. A method of managing a homomorphic encryption operation key, the method comprising:
    receiving a token and a request for a homomorphic encryption operation key from a first server;
    verifying validity of the token, and generating the homomorphic encryption operation key using one or more public keys for a first electronic device identified based on data obtained by decrypting the token when validity has been proved; and
    transmitting the homomorphic encryption operation key to the first server,
    wherein the one or more public keys include a hierarchical Galois key generated using a secret key of the first electronic device, and
    the generating includes generating one or more homomorphic rotation operation keys by repeatedly performing a rotation operation using the hierarchical Galois key.

9. The method according to claim 8, further comprising transmitting a message indicating that the token is invalid to the first server when the token is invalid.

10. The method according to claim 8, wherein the verifying includes determining that validity is proved when the token is decrypted using an encryption method preset with the first electronic device.

11. The method according to claim 8, wherein the token encrypts and includes at least one of a user identity of the first electronic device, allowed operation time information, a type and range of an operation key allowed to be generated, or a random nonce issued by the first electronic device.

12. The method according to claim 11, wherein the generating includes transmitting a message for suspending use of the homomorphic encryption operation key to the first server without generating the homomorphic encryption operation key when a request time for the operation key is outside an allowed range based on the allowed operation time information.

13. The method according to claim 11, wherein:
    the verifying includes checking the random nonce according to a type of operation key request of the first server; and
    the homomorphic encryption operation key is generated in response to a case where the token is valid.

14. The method according to claim 8, further comprising setting a storage period of the homomorphic encryption operation key according to content negotiated with the first electronic device, and storing the homomorphic encryption operation key in a memory.

15. A computer-readable non-transitory recording medium storing an instruction for controlling an electronic device including at least one processor, a memory, and a communication interface when the instruction is executed by the at least one processor, comprising:
- a request for a homomorphic encryption operation key and a first token for a first electronic device are received from a first server;
- the first token is decrypted based on a first encryption method for the first electronic device stored in the memory;
- the memory is searched for the homomorphic encryption operation key in response to the decryption being successful;
- the homomorphic encryption operation key is transmitted to the first server in response to the homomorphic encryption operation key being searched for; and
- a homomorphic rotation operation key is generated using a public key and a hierarchical Galois key of the first electronic device stored in the memory and transmitted to the first server in response to not searching the memory for the homomorphic encryption operation key, wherein the generating of the homomorphic rotation operation key is generating one or more homomorphic rotation operation keys by repeatedly performing a rotation operation on the public key using the hierarchical Galois key.

16. The computer-readable non-transitory recording medium according to claim 15, wherein:

- the generating of the homomorphic rotation operation key is generating the homomorphic rotation operation key based on data obtained by decrypting the first token; and
- the decrypted data includes at least one of a user identity of the first electronic device, allowed operation time information, a type and range of an operation key allowed to be generated, or a random nonce issued by the first electronic device.

* * * * *